A. T. SMITH.
VEHICLE WHEEL.
APPLICATION FILED FEB. 19, 1914.
1,131,965.
Patented Mar. 16, 1915.
2 SHEETS—SHEET 1.
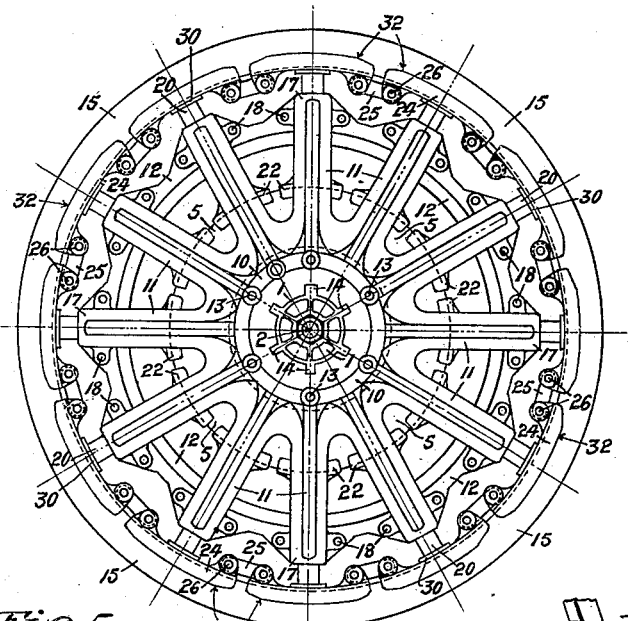
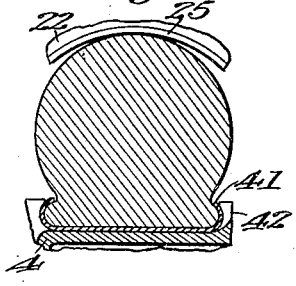
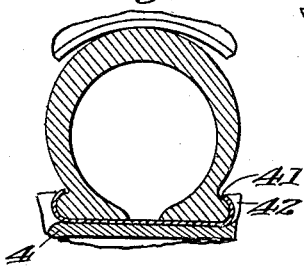
Witnesses
Floyd R. Cornwall.
F. M. Meyer
Inventor
A. T. Smith
By *[signature]*
Atty.

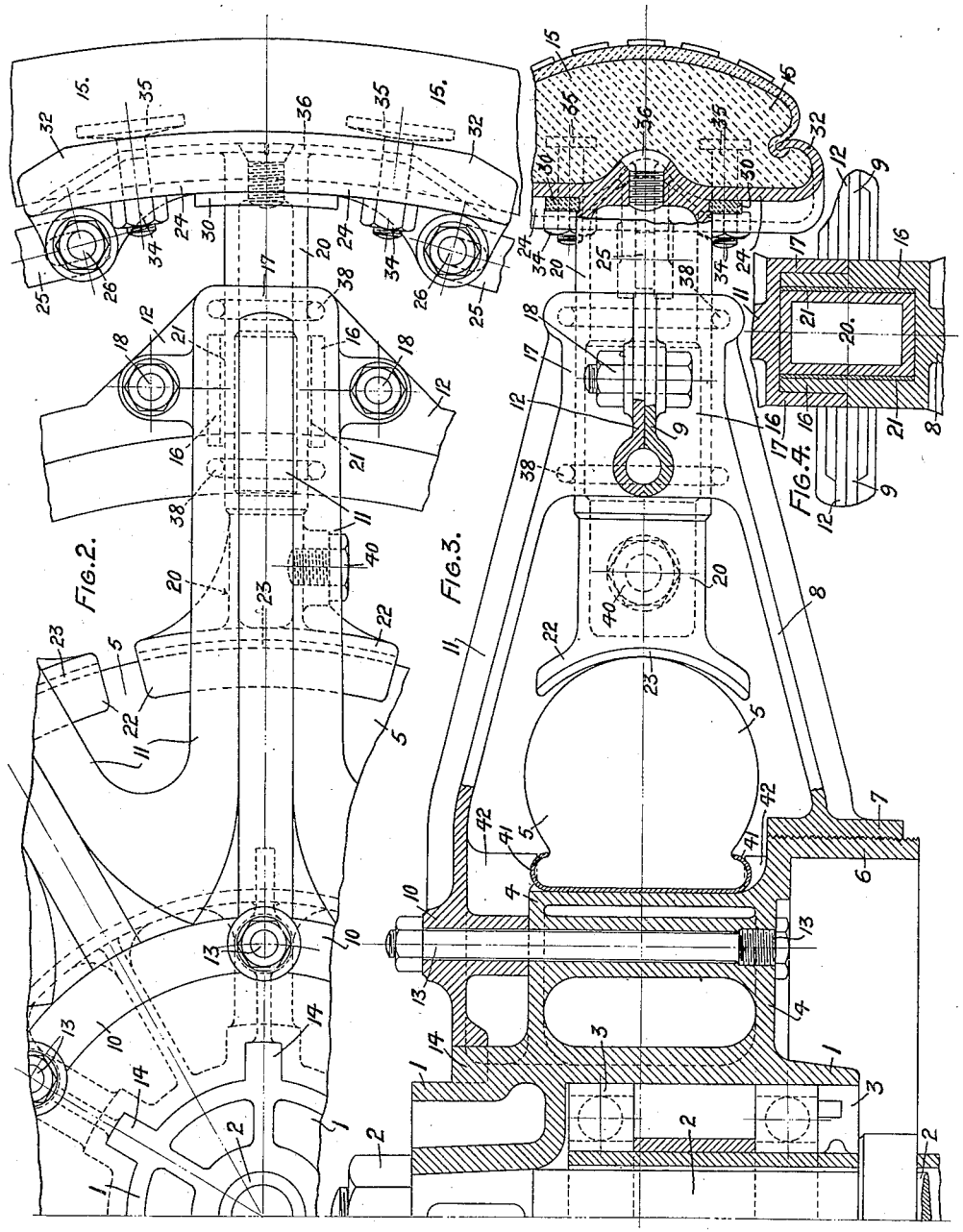

UNITED STATES PATENT OFFICE.

ALGERNON THORNTON SMITH, OF BIRKDALE, ENGLAND.

VEHICLE-WHEEL.

1,131,965.  Specification of Letters Patent.  Patented Mar. 16, 1915.

Application filed February 19, 1914. Serial No. 819,794.

*To all whom it may concern:*

Be it known that I, ALGERNON THORNTON SMITH, a subject of the King of England, residing at Birkdale, in the county of Lancaster, England, have invented certain new and useful Improvements in or Connected with Vehicle-Wheels, of which the following is a specification.

This invention has reference to vehicle wheels, and more particularly those of self-propelled vehicles employed on common roads and streets, and of the type in which a pneumatic or elastic cushion or body is disposed between the outer part of the wheel and the hub, and more or less near the hub, and the outer part has movement radially in relation to the inner part and axis; and radial members are disposed between the outer part and elastic body, and operate in guides connected by radial arms to rings on the hub. And the object of the invention is primarily, to provide a wheel of this kind, which is strong, simple, and well adapted to the purposes for which it is intended.

In a vehicle wheel comprising the improvements hereunder, the radial arms extend outward at each side, and are disposed in the same radial planes as the corresponding radial members or spokes, and have at their outer ends or parts ring sections and embossed portions, the latter forming say, half a rectangle (or it might be a curved figure), and serving as guides and supports to the spokes extending from the outer rim inward to the pneumatic or elastic medium within these guides or supports, the ring sections coming together between the guides or supports, and being fastened together at each side of the same by bolts and nuts or the like. At the boss or hub, these portions which extend out, are in the form of plates; and one has upon it, near the hub, a threaded ring or neck which screws on to a corresponding thread on this end of the hub; which may, at this side, be flanged, and against which flange, a portion of the ring abuts when screwed up. The other side or part which carries the supports or guides will also be of plate form at the hub; and within these plate parts over the hub, there is fitted an inner ring or wheel which carries the rim in which the pneumatic or elastic cushion or tire may be fitted and fixed; and these parts may be drawn together and held by "through" bolts and nuts; and keys will be introduced from the outer end of the hub through the outer plate and the inner part just described; or such keys may be formed on the hub, so that these parts fit over them, and are held by them, and will revolve with the hub; while the hub portion, and ring portion which are fastened together by screws, as above described, may be locked in position by screw pins, studs, or the like, entered through the hub flange.

The cushion or tire carrier or ring can have a detachable plate on the outside for fastening the cushion or tire on and taking it off its carrier; and access to the interior of the wheel for this or other purposes, is had by unfastening the through bolts referred to, or removing the nuts of same, and removing the nuts from the fastening bolts of the spoke guides or supports.

By means of the construction described, all the parts can be simply assembled or put together, and the whole constitutes a simple construction, and furnishes a firm and stable wheel.

The spokes have at their inner ends, and at their outer ends, a species of saddle; and when they are assembled, these parts come within a short distance of one another at their adjacent ends around the wheel. The inner saddles fit over the pneumatic or inner elastic cushion or tire; and the outer saddles—which are preferably relatively broad—will hold and grip in them, an outer elastic tire, preferably a solid one, comprised of rubber and canvas.

In the drawings hereto annexed, Figure 1 is an outside side elevation of a wheel comprising the improvements hereunder. Fig. 2 is an enlarged detail showing a portion of one section of Fig. 1. Fig. 3 is a horizontal median section through Fig. 2. Fig. 4 is a transverse section through one of the spokes and its guides. Fig. 5 is a detail section illustrating a solid tire as a cushion between the spokes and the hub. Fig. 6 is a similar view illustrating a pneumatic tire as a cushion between the hub and spokes. Fig. 7 is a detail section illustrating the ring of the hub and the yoke supporting arms integral.

Referring now to the drawings, 1 is the hub portion of the wheel, which in the case shown is adapted at one side to be connected to the driving axle 2 in the well known manner; while, within the internal portion of the hub at the other part of the wheel, the usual ball bearing portion 3 lies. This hub portion 1 has around it an outer and larger portion 4 of cylindrical form externally, on to the outer portion of which the pneumatic or elastic cushion or body 5 is fitted; and at one side of this part 4, there is a ring 6, which has upon its exterior a screw thread as shown; and on to this thread there is screwed a ring part 7, having a plurality of arms 8, at the outer ends or parts of which a ring 9 and parts hereafter described, are adapted to serve as guides to the spokes. As a modification the arms 8 will be formed in one with the ring 6 and the thread portion and ring part 7 dispensed with, as shown in Fig. 7. At the other side of the wheel, there is another ring 10 similar somewhat to 7, having arms 11 in it, corresponding with the arms 8, and having a ring portion 12 similar to 9 connecting these arms together; and at the hub, this plate 10 is provided with holes through it, and is adapted to be fastened to the hub part 4 by through bolts and nuts 13. The inner periphery or edge of the plate 10 is provided with gaps in it, which are adapted to fit over corresponding rectangular key projections 14 on the hub portion 1 which holds the two parts together, and causes them to revolve together.

The arms 8, 11, carry as above stated, at their outer parts the ring portions 9 and 12 respectively; and these ring portions 9 and 12 are formed respectively on the embossed or box portions 16 and 17, and thus in the construction shown, the two ring arms, and guide boxes are all in one at each side of the wheel. The embossed or guide box portions 16, 17, are rectangular in the case shown; and these two parts and the rings 9, 12, are clamped and held together by bolts and nuts 18. One of the guide box parts 16, is extended on the inside for the full width of the aperture formed by them; and the other box portion, 17, is made to fit over the outer half of these other box portions, and so they engage and interlock with one another.

20 represents the spokes, which are rectangular and hollow, and they fit and work on the inside surfaces of the guide portions 16, 17, which on two sides are provided internally with a liner 21, say of brass or the like. These liners take the greatest pressure and wear, and can be readily removed. The spokes 20 have at their inner end, a species of saddle 22, which has a leather or other suitable liner 23, and rests on the outside of the elastic cushion 5. Circumferentially the saddles are made substantially of the same radius as that of the cushion; while in the transverse direction, they normally will touch only the outer central part of this cushion, and stand off same on each side of the vertical plane of the wheel, as shown. At the outer ends, the spokes 20 are also each provided with a saddle 24, within which lies the outer tire 15; and the ends of the adjacent saddle parts 24 come within a short distance of one another, as shown; and at these ends they are connected together by links 25 and pins 26, which pass through lugs on the under side of the saddles 24. The holes in the links are elongated or slotted, so that the saddle parts 24 are capable of moving toward and away from one another as they are radially moved inward and outward in actual use when nearest the road surface; but when away from this position, the links will be taut on the pins 26, and link up the saddles 24, together. The spoke portions 20 are made in one with the saddles 24 in the case shown, and are provided on the inner sides of the saddles with leather or like washers 30, which may form buffers between the outer parts of the guides 16, 17 and the inner sides of the saddles 24.

The outer tire, generally designated 15, is in one form, more or less of ellipse form, having beads at its edges, and grooves, into the latter of which the inturned edges 32 of the saddles 24 enter; and this tire 15 may be constructed mainly of rubber and canvas, or any suitable material more or less elastic or soft; and it may be provided at its outer part which comes next to the road, with a layer of leather or the like, and preferably with metal studs in it. For the greater part of the tire 15 which lies within the shoes 24, it is hollowed out inside, and a projecting part 36 of the shoes lies in, and fills this hollow; and the tire is further secured in position by two sets of bolts 34, having enlarged heads 35 on them built and lying within the interior portion of the tire; the bolts being passed through the bottoms of the shoes, on each side of the center plane of the wheel, and secured by nuts.

The projecting center portions 36 of the saddles which project up into the interior of the tire, in conjunction with the bolts 34, 35, and the flanges 32, of the saddle, support the tire in all directions in an advantageous manner, so as to enable it to take well all the stresses and strains to which it is subjected.

The spokes 20, as stated, are hollow, and they may be filled with lubricant, and provided with small holes in the portion which passes through the guide parts 16, 17, and so enable lubricant to pass to the rubbing surface of the spokes and guides; and packing rings 38 are fitted in recesses in the outer and inner ends of the guide parts 16, 17, so as to retain the lubricant within them, and to exclude dust and dirt from the rubbing surfaces. The hollow spokes are provided with screw plugs 40, through the apertures normally filled by which, lubricant can be introduced into the spokes.

As above stated, the internal cushion 5 may be of ordinary pneumatic tire construction and type, and held at its edges by a metal rim or carrier 41, which is adapted to slide on to the inner hub portion 4, and to hold the outer part or cover of the cushion if of ordinary pneumatic tire construction, together, in the well known way. Laterally, this rim 41 will be held in position by parts 42 on the inside of the arm plate 10.

The box of the ring plate 7 on its interior, is screw threaded, say with a left hand thread, which screws on to a thread 6, on the hub portion, and it is suitably keyed thereon, or fixed in position and is rendered permanent. While, on the other hand, the arm ring 10 is detachably held in position on the hub by the several through bolts 13. The outer portion of these parts, that is, the rings 9 and 12, and guide parts 16, 17, are held together by the bolts and nuts 18, which pass through lugs on, and parts of the ring portions 9, 12.

In action, as the wheel runs over the ground, it will be seen, that the inner part will be eccentric to the outer part, and be closest to the outer part below, and farthest from it at the upper part; so that as the wheel runs along the ground, the inner and outer parts will in this manner, be constantly changing their positions in relation to one another.

With regard to the materials of which the parts are made, the metal parts may be of steel (cast or pressed) or malleable iron, or of any other suitable metal or alloy. And as regards the inner cushion, and outer tire parts, while those specified herein may be employed with advantage, the invention is not in any way restricted to the use of these parts made in these particular manners, and of the particular materials specified. But in all cases, the chief elastic medium of the wheel is the inner cushion 5, which, as stated, will in many cases, be preferably similar to a pneumatic tire as shown in Fig. 6; or it may be of solid rubber as shown in Fig. 5, or rubber and fabric, such as used on omnibus wheels where the pneumatic construction or type of cushion is not suitable or expedient.

What is claimed is:—

1. In a wheel, the combination of a hub formed in one piece and provided with transverse openings and an annular threaded flange on one end, a ring having radial arms, said ring having openings in its inner portion, bolts extending through the latter openings and the transverse openings in the hub, the outer ends of the arms having depressed portions, a second ring internally threaded and engaging the threaded flange of the hub, said second mentioned ring having radial arms corresponding to the arms of the aforesaid ring and formed at their outer ends with depressions to form with the corresponding depressions on the first mentioned arms spoke guides, the arms of both rings adjacent the depressions having perforated lugs, bolts passing through said lugs to fasten the arms together, spokes extending through the guides, each spoke having at its opposite ends saddles, a pneumatic tire interposed between the hub and the saddles on the inner ends of the spokes, a resilient tire engaging the saddles at the outer ends of the spokes, and links pivotally connecting the saddles at the outer ends of the spokes.

2. In a wheel, the combination of a hub formed in one piece and provided with an end annular flange of greater diameter than the central portion of the hub, said annular flange being externally threaded, the hub being provided with transverse openings inside the plane of the threaded flange, a ring formed at its inner portion with openings which correspond with the openings in the hub, bolts extending through the openings to fasten the ring and the hub together, the ring having radial arms provided with depressions at their outer ends, lugs on the inner surface of the ring, said lugs being in substantial alinement with the threaded flange, a second ring having a threaded portion which engages the threaded flange, said second ring having arms formed at the outer ends with depressions which, with the depressions on the first mentioned arms form spoke guides, a pneumatic tire surrounding the central portion of the hub and confined between the threaded flange and the lugs on the first mentioned ring, spokes operating in the guides, said spokes engaging the pneumatic tire, and a resilient tire engaging the outer ends of the said spokes.

In testimony whereof I have signed my name to this specification in the presence of two subscribing witnesses.

ALGERNON THORNTON SMITH.

Witnesses:
SOMERVILLE GOODALL,
CLIFFORD F. ROYSTON.

Copies of this patent may be obtained for five cents each, by addressing the "Commissioner of Patents, Washington, D. C."